United States Patent [19]

Fennemann et al.

[11] 4,431,573

[45] Feb. 14, 1984

[54] METHOD OF PRODUCING AN ALKALI SULFATE CATALYST $V_2O_5$

[75] Inventors: Wolfgang Fennemann, Karben; Ulrich Sander, Friedrichsdorf; Manfred Bick, Oberursel, all of Fed. Rep. of Germany

[73] Assignee: Metallgesellschaft Aktiengesellschaft, Frankfurt am Main, Fed. Rep. of Germany

[21] Appl. No.: 296,563

[22] Filed: Aug. 26, 1981

[30] Foreign Application Priority Data

Sep. 4, 1980 [DE] Fed. Rep. of Germany ....... 3033319

[51] Int. Cl.³ .............................................. B01J 27/02
[52] U.S. Cl. ................................................... 502/218
[58] Field of Search ......................................... 252/440

[56] References Cited

U.S. PATENT DOCUMENTS

| | | |
|---|---|---|
| 1,941,426 | 12/1933 | Beardsley et al. ................. 23/175 |
| 2,769,018 | 10/1956 | West ............................. 252/440 X |
| 3,182,027 | 5/1965 | Riley ............................. 252/440 X |
| 3,226,338 | 12/1965 | Riley et al. ........................ 252/440 |
| 3,275,406 | 9/1966 | Krempff . | 
| 3,562,183 | 2/1971 | Song et al. ......................... 252/440 |
| 4,184,980 | 1/1980 | Sherif et al. .................... 252/440 X |
| 4,294,723 | 10/1981 | Hara et al. ......................... 252/440 |

FOREIGN PATENT DOCUMENTS

| | | |
|---|---|---|
| 116361 | 2/1928 | Austria . |
| 565801 | 11/1958 | Canada ............................. 252/440 |
| 19174 | of 0000 | European Pat. Off. . |
| 1086218 | of 0000 | Fed. Rep. of Germany . |
| 2057251 | of 0000 | Fed. Rep. of Germany . |
| 1281407 | 10/1968 | Fed. Rep. of Germany . |
| 1542177 | 5/1969 | Fed. Rep. of Germany . |
| 538139 | 6/1922 | France . |
| 1393170 | 5/1964 | France ............................. 252/440 |
| 39-18103 | 8/1964 | Japan .............................. 252/440 |

OTHER PUBLICATIONS

Die Schwefelsäurefabrikation Friedr Vieweg & Sohn Braunschweig 1961, pp. 252-259.

*Primary Examiner*—William G. Wright
*Attorney, Agent, or Firm*—Karl F. Ross; Herbert Dubno

[57] ABSTRACT

A catalyst for oxidizing $SO_2$ to $SO_3$ and containing $V_2O_5$ and alkali sulfate in a molar ratio below 1 is produced by impregnating prefabricated support bodies with a solution of the active substances in sulfuric acid and the impregnated support bodies are dried and moved at the same time.

10 Claims, No Drawings

METHOD OF PRODUCING AN ALKALI SULFATE CATALYST V₂O₅

FIELD OF THE INVENTION

Our present invention relates to a method of producing a catalyst which contains $V_2O_5$ and alkali sulfate and is capable of oxidizing $SO_2$ to $SO_3$ and in which the molar ratio of $V_2O_5$ to alkali metal sulfate is less than 1.

BACKGROUND OF THE INVENTION

The catalytic reaction of $SO_2$ and oxygen to form $SO_3$ in contact-catalysis systems is now effected with the aid of catalysts that contain $V_2O_5$ and alkali sulfate as active substances.

Such catalysts are required to effect a high conversion of $SO_2$ to $SO_3$ at a low reaction temperature and to have a low susceptibility to higher temperatures and to have a high mechanical strength. These properties depend to a large degree on the method by which the catalyst is produced.

French patent No. 538,139 describes a process in which catalyst-support bodies are impregnated with a pure solution of vanadium in sulfuric acid. The resulting catalyst effected only a conversion below 95% and about 1000 liters of catalyst were required per metric ton of $H_2SO_4$ produced per day. These poor properties are probably the reason why an acid impregnation has not been used thereafter.

From B. Waeser "Die Schwefelsäurefabrikation", 1961, Verlag Friedrich Vieweg und Sohn, Braunschweig, Germany, pages 258 to 258, and from German patent document 12 81 407, German patent document 15 42 177, Austrian patent 116,361 and U.S. Pat. No. 1,941,426 it is known to impregnate support bodies with alkaline or neutral solutions which contain $V_2O_5$ and alkali compounds.

Impregnation with alkali involves the risk of a chemical attack on the $SiO_2$ content of the substrate bodies, such that the mechanical strength and the internal surface area are decreased.

Where a neutral impregnation is effected, the impregntion and drying steps must be repeated because the active substances are of low solubility. As a result, the exact adjustment of the active-substance content is difficult and production is expensive.

From B. Waeser "Die Schwefelsäurefabrikation", 1961, it is also known to form a paste of kieselguhr and solutions of the active substances and to make the catalyst bodies from said paste.

By that process it is difficult to make bodies which are uniform in composition and the danger of the formation of defective catalysts is high.

OBJECTS OF THE INVENTION

It is an object of the invention to provide a process for making an $SO_2$ oxidation catalyst in a simple manner and so as to ensure that the catalyst bodies always have a uniform composition, a large internal surface area and a high mechanical strength.

Another object is to provide a method of making an improved catalyst capable of a very high conversion of $SO_2$ to $SO_3$ even at low temperatures and stability even at high conversion temperatures.

DESCRIPTION OF THE INVENTION

These objects and others which will become apparent hereinafter, are attained in accordance with the invention in a method wherein the impregnating solution contains per liter 600 to 1100 grams $H_2SO_4$ and 140 to 830 grams $V_2O_5$ and alkali sulfate, the impregnation is effected at a temperature between 60° C. and the boiling point of the impregnating solution employed and the impregnated support bodies are moved as they are dried.

During the impregnation the temperature and sulfuric acid concentration are so adjusted in the stated ranges that there will be no crystallization and/or hydrolysis of the active substances during the processing.

In impregnating solutions which must be stable for a plurality of days the sulfuric acid concentration must be adjusted in a very narrow, optimum range. In impregnating solutions which are used shortly after they have been prepared, the sulfuric acid concentration may be lower or higher than that optimum range.

The temperature depends on the concentration of active substances and on their chemical composition. The higher the concentration of active substances, the narrower will be the permissible temperature range. Only an exactly defined temperature is permissible in practice at a high concentration. In case of lower concentration, a higher or lower temperature may be employed. Also regarding temperature, a larger range can be selected for solutions to be used immediately after they have been produced.

The understanding of these relationships will be facilitated by an inspection of the tables below which show the dependencies for solutions that are stable for a prolonged time. The limits stated above are applicable to solutions which are stable only for a short time.

The alkali sulfates may consist of $Na_2SO_4$, $K_2SO_4$, $Cs_2SO_4$, $Rb_2SO_4$, alone or in mixtures and are used in a molar ratio with the $V_2O_5$ as desired in the final catalyst. The $V_2O_5$/alkali sulfate molar ratio should be $<1$ and $\geq 0.25$.

The prefabricated support bodies should have the following properties:
(a) $SiO_2$ content above 90%, preferably above 97%;
(b) Internal surface area (B.E.T. method) above 10 m²/g, preferably 20 to 200 m²/g;
(c) Particle size 2 to 12 mm, preferably 4 to 8 mm;
(d) Mechanical crushing strength above 2 kg per body;
(e) Mechanical abrasion below 1%, preferably below 0.5%.

In accordance with a preferred additional feature, the support bodies contain 5 to 10% by weight $V_2O_5$ and contain $V_2O_5$ to alkali sulfate in a molar ratio of 0.67 to 0.29. This will result in especially high conversion activities.

Advantageously, the impregnating solution contains 800 to 1000 grams $H_2SO_4$ per liter, preferably 850 to 950 g $H_2SO_4$ per liter. Even the larger range ensured that there will be no crystallization or hydrolysis. This will be effectively ensured by the narrower range even when the impregnating solution is used after considerable time.

The impregnating solution can preferably contain 275 to 720 g $V_2O_5$ and alkali sulfate per liter. In this way, an impregnating solution can be produced which has a high concentration of active substances and in which crystallization and hydrolysis will be effectively prevented.

In accordance with a further preferred feature, the alkali sulfate which is used consists of a mixture of $K_2SO_4$ and $Cs_2SO_4$ and the molar proportion of the $Cs_2SO_4$ in said mixture amounts to 5 to 30%, preferably 10 to 20%. The use of that active substance results in catalysts having high conversion activities at low temperatures.

We have found it to be particularly desirable that the support bodies can be heated to least to the minimum temperature of the impregnating solution before they are impregnated. That minimum temperature of the impregnating solution is the temperature below which crystallization and/or hydrolysis occurs. The preheating of the support bodies prevents deterioration of the catalyst by a crystallization or hydrolysis on the surface of the support bodies.

The support bodies can be introduced into an excess of the impregnating solution and immersed therein for at least 2 minutes and preferably for 10 to 30 minutes; then being separated from the impregnating solution which has not been absorbed.

This practice will result in a uniform impregnation of the support bodies even when the quantity of impregnating solution has not been exactly proportioned.

The support bodies also can be impregnated with impregnating solution in a quantity up to the quantity which can be absorbed by the support bodies and preferably in a quantity which is 90 to 95% of the absorbable quantity. In this case the support bodies are moved during the impregnation so that a uniform impregnation will be effected. Thus it is not necessary to separate the support bodies from surplus impregnating solution and impregnating solutions may be used which are stable only for relatively short times. The support bodies do not contain surplus impregnating solution.

In accordance with a further preferred feature, the drying of the impregnated support bodies is effected in a first step at 120° to 200° C. and at a subatmospheric to normal pressure, preferably at 140° to 180° C. and 25 to 200 millibars, and more than 50%, preferably 60 to 90% of the quantity of water introduced with the impregnating solution is evaporated in said first step, which is followed by a second or final drying step carried out for at least 15 minutes at temperatures of 250° to 700° C., preferably at 300° to 400° C. As a result, the active substances remaining after the drying will be uniformly distributed throughout the volume of the support bodies.

In accordance with a preferred feature, the active substances are introduced into the support bodies by a single impregnation. This will result in a uniform impregnation at low cost.

SPECIFIC EXAMPLES

Spherical support bodies were used, which had the following properties:

| | |
|---|---|
| Diameter | 5–5.5 mm |
| Mean diameter | 5.25 mm |
| $SiO_2$ content | 98% |
| Buld density (when dried) | 540 g/l |
| Crushing strength | about 4 kg per sphere |
| External surface area | 0.64 m²/l |
| Internal surface area (B.E.T. method) | 130–150 m²/l |
| Loss by abrasion | 0.3% after 3 × 10 minutes |
| Porosity | 100 g absorb about 72 g water |

Without the $SO_3$ and $H_2SO_4$ contents, the catalyst was required to have the following composition in % by weight

| | |
|---|---|
| $V_2O_5$ | 8.00 |
| $K_2SO_4$ | 19.16 |
| Support spheres | 72.84 |

Three different impregnating solutions were used. Each solution contained arithmetically the active substances in the same quantities (152.5 g $V_2O_5$/l; 197.5 g $K_2O$/l), but in different chemical compounds.

Impregnating Solution 1

To prepare this solution, 196.2 g $NH_4VO_3$ were dissolved in caustic potash solution (KOH content 235.3 g). The resulting $NH_3$ was boiled off. Water was used to fill up to 1 liter.

| Result: |
|---|
| 152.5 g $V_2O_5$/l |
| 235.3 g KOH/l |
| 231.5 g $KVO_3$/l |
| 141.2 g KOH/l |

As the solution was stable at room temprature, it was used for impregnating at room temperature.

Impregnating Solution 2

To prepare this solution, 196.2 g $NH_4VO_3$ were dissolved in caustic potash solution (KOH content 94.1 g). The resulting $NH_3$ was boiled off. 173.9 g $K_2CO_3$ were added. $H_2O$ was used to fill up to 1 liter so that a clear solution was obtained.

| Result: |
|---|
| 152.5 g $V_2O_5$/l |
| 94.1 g KOH/l |
| 173.9 g $K_2CO_3$/l |
| 231.5 g $KVO_3$/l |
| 173.9 g $K_2CO_3$/l |

As the solution was stable at room temperature, it was used for impregnating at room temperature.

Impregnating Solution 3

To prepare this solution, 152.5 g $V_2O_5$ were dissolved in 150 g $H_2O$ and 900 g concentrated $H_2SO_4$, 364.9 g $K_2SO_4$ were added and $H_2O$ was used to fill up to 1 liter at elevated temperature, so that a clear solution was obtained.

| Result: |
|---|
| 152.5 g $V_2O_5$/l |
| 364.9 g $K_2SO_4$/l |
| 900 g $H_2SO_4$/l |

In order to avoid crystallization and hydrolysis, the impregnating solution was adjusted to a temperature of 115° C. Impregnation was effected at that temperature, to which the support bodies had also been preheated.

The support spheres were treated with the impregnating solutions for 30 minutes and the surplus solution was decanted. The spheres were dryed at 150° C. in a water jet vacuum for 60 minutes so that 70 to 90% of the quantity of water introduced with the impregnating solution had been evaporated, and were baked at 300° C. for 120 minutes.

Equal relations of V:K:Si were confirmed by analysis.

The catalyst had the following properties (the numbers are those of the impregnating solutions used to make the catalyst):

Catalyst 1

More than one half of all spheres were cracked or burst. The abrasion amounted to 7 to 8%. As spheres impregnated with water were not deteriorated (abrasion below 0.1%) in a control experiment, the loss of mechnical strength is probably due to the chemical attack of the $SiO_2$ support by the strongly alkaline impregnating solution. The conversion activity was not measured.

Catalyst 2

Because the free KOH had been replaced by the less basic $K_2CO_3$, an external attack on the support spheres was not observed. On the other hand, a test in accordance with the standard method did not result in a satisfactory conversion activity.

| | |
|---|---|
| Maximum conversion | 95% at 450 to 455° C. |
| Abrasion | 0.1 to 0.8% |
| Crushing strength | 7 to 8 kg per sphere |

It was not possible to further decrease the alkalinity in that $K_2CO_3$ was replaced by $K_2SO_4$ because the solubility was inadequate.

Catalyst 3

Whereas catalysts 1 and 2 had to be sulfated (formed, neutralized) before use owing to their alkaline reaction, catalyst 3 could be used directly, without sulfation. That catalyst had the following, very good properties:

| | |
|---|---|
| Abrasion | below 0.1% |
| Crushing strength | 11 kg per sphere |
| Maximum conversion | 98.64% at 420° C. |

Catalyst 4

The $K_2SO_4$ in impregnating solution 3 was replaced in part by $Cs_2SO_4$. This resulted in a distinct increase of the conversion activity and of the thermal stability.

Increase of Conversion Activity:

| Moles Cs % | Maximum conversion % | Temperature °C. | Abrasion % |
|---|---|---|---|
| 0 | 98.64 | 420 | below 0.1% |
| 2 | 98.72 | 420 | " |
| 4 | 98.73 | 420 | " |
| 6 | 98.73 | 420 | " |
| 10 | 98.80 | 420 | " |
| 15 | 98.94 | 415 | " |
| 20 | 98.90 | 410 | " |
| 30 | 98.92 | 405 | " |

Increase of Thermal Stability:

The catalyst was baked in the air at 680° C. for 260 hours. The following conversion activities were obtained:

| Moles Cs % | Maximum conversion % | Temperature °C. | Abrasion % |
|---|---|---|---|
| 0 | 98.37 | 435 | 0.2 to 0.4 |
| 2 | 98.36 | 435 | " |
| 6 | 98.58 | 430 | " |
| 10 | 98.66 | 435 | " |
| 15 | 98.72 | 425 | " |

Commercially available catalysts having comparable contents of active substances but containing no Cs and having been made by extrusion were examined for a comparison.

Catalyst for normal operating temperatures:

| | |
|---|---|
| Maximum conversion | 98.34% at 430° C. |
| Abrasion | 1.0% |

After the catalyst had been baked at 680° C. for 260 hours, these properties had changed as follows:

| | |
|---|---|
| Maximum conversion | 97.97% at 440° C. |
| Abrasion | 16% |

Catalyst for low operating temperatures:

| | |
|---|---|
| Maximum conversion | 98.64% at 420° C. |
| Abrasion | 0.4% |

After the catalyst had been baked at 680° C. for 260 hours, these properties had changed as follows:

| | |
|---|---|
| Maximum conversion | 98.25% at 435° C. |
| Abrasion | 21% |

In the following tables, the dependence of the stability of acid impregnating solutions on temperature, the $H_2SO_4$ content and the active substances is shown in the following tables, where the symbol "+" means that the impregnating solution did not exhibit crystallization or hydrolysis after 2 days. The symbol "−" indicates the occurrence of such phenomena.

TABLE 1

Impregnating solution: 152.5 g $V_2O_5$/l; 364.9 g $K_2SO_4$/l

| Temperature °C. | $H_2SO_4$ Content (g/l) | | | |
|---|---|---|---|---|
| | 700 | 800 | 900 | 1000 |
| Boiling point | 130 | 138 | 151 | 160 |
| 140 | not applicable | not applicable | − | − |
| 130 | not applicable | − | − | − |
| 120 | − | − | + | − |
| 110 | not observed | not observed | + | not observed |
| 100 | − | − | − | − |
| 80 | − | − | − | − |
| | 840 | 860 | 940 | 960 |
| 120 | − | + | + | 31 |

TABLE 2

Impregnating solution: 114.4 g $V_2O_5$/l; 273.7 g $K_2SO_4$/l

| Temperature °C. | $H_2SO_4$ Content (g/l) | | | |
|---|---|---|---|---|
| | 700 | 800 | 900 | 1000 |
| Boiling point | 128 | 137 | 150 | 158 |
| 140 | not applicable | not applicable | + | − |
| 130 | not observed | − | not observed | not observed |
| 120 | − | − | + | − |
| 100 | − | − | + | − |
| 80 | − | − | + | − |
| 60 | not observed | not observed | − | not observed |

TABLE 3

Impregnating solution: 76.3 g $V_2O_5$/l; 182.5 g $K_2SO_4$/l

| Temperature °C. | $H_2SO_4$ Content (g/l) | | | |
|---|---|---|---|---|
| | 700 | 800 | 900 | 1000 |
| Boiling point | 125 | 136 | 147 | 157 |
| 140 | not applicable | not applicable | + | − |
| 100 | − | − | + | − |
| 80 | − | − | + | − |
| 60 | not observed | not observed | − | − |

TABLE 4

Impregnating solution: 191 g $V_2O_5$/l; 640 g $K_2SO_4$/l

| Temperature °C. | $H_2SO_4$ Content (g/l) | | |
|---|---|---|---|
| | 800 | 900 | 1000 |
| 140 | − | − | − |
| 120 | − | − | − |
| 115 | − | + | − |
| 110 | − | − | − |

Abrasion Test

About 50 g catalyst are weighed and placed into an empty 1-liter porcelain trough of a vibrating mill and vibrated for three periods of 10 minutes. After each period of 10 minutes, the catalyst was screened to remove the fines below 0.5 mm before the treatment was continued. The catalyst was weighed to determine the abrasion, which was stated in % by weight.

Conversion Activity Test

The test set-up consists of a double-shell tube, which is provided on the outside with an electric heating coil. The entering gas flowed through the space between the catalyst to be tested and the heating shell and is thus heated to an inlet temperature of about 500° C.

The use of the double shell ensures that hot spots in the catalyst will be prevented. A slidable thermocouple is provided in the middle of the catalyst to be tested. The heating coil and/or the heat insulation is so adjusted that the temperature gradient is as uniform as possible throughout the catalyst layer. The temperature stated as the converison temperature is the temperature that is obtained 5 cm below the sieve plate which supports the catalyst. As a result, the temperature of the flowing gas changes throughout the range from 500° to 380° C. The conversion is determined at decreasing temperature and in intervals of 10 minutes. The values obtained are plotted on a graph on which the theoretical equilibrium conversion is plotted too.

The advantages afforded by the invention reside in that catalysts which have very good properties and have an entirely uniform composition, which can be selected as desired, can be made in a simple manner. The catalyst have high conversion activities at low temperatures and are mechanically stable even at high temperatures. The active substances can be derived from inexpensive starting materials.

We claim:

1. A method of producing a catalyst for the contact catalysis conversion of $SO_2$ to $SO_3$ which comprises the steps of:
   (a) providing prefabricated catalyst-support bodies;
   (b) impregnating a mass of said prefabricated catalyst-support bodies with an aqueous impregnating solution consisting essentially of 600 to 1100 grams per liter of free $H_2SO_4$ and 140 to 830 grams per liter $V_2O_5$ and an alkali sulfate, the $V_2O_5$ being a molar ratio to said alkali sulfate of less than 1, at an impregnation temperature between 60° C. and the boiling point of the impregnating solution; and
   (c) drying the empregnated mass while moving the support bodies.

2. The method defined in claim 1 wherein the support bodies contain 5 to 10% by weight $V_2O_5$ and contain $V_2O_5$ to alkali sulfate in a molar ratio of 0.67 to 0.29.

3. The method defined in claim 1 wherein the impregnating solution contains 800 to 1000 grams $H_2SO_4$ per liter.

4. The method defined in claim 1 wherein the impregnating solution contains 275 to 720 g $V_2O_5$ and alkali sulfate per liter.

5. The method defined in claim 1 wherein said alkali sulfate is a mixture of $K_2SO_4$ and $Cs_2SO_4$ and the molar proportion of the $Cs_2SO_4$ in said mixture is 5 to 30%.

6. The method defined in claim 1 wherein the support bodies are heated at least to the minimum temperature of the impregnating solution prior to step (b).

7. The method defined in claim 1 wherein the support bodies are introduced into a surplus quantity of the impregnating solution and are immersed therein for at least 2 minutes, and are then separated from the impregnating solution which has not been absorbed before they are impregnated.

8. The method defined in claim 1 wherein the support bodies are impregnated with impregnating solution in a quantity which is 90 to 95% of the quantity which can be absorbed by the support.

9. The method defined in claim 1 wherein the drying of the impregnated support bodies is effected in a first step at 120° to 200° C. and at a pressure of 25 to 100 millibars, and more than 50% of the quantity of water introduced with the impregnating solution is evaporated in said first step, which is succeeded by a second dryfing step carried out for at least 15 minutes at a tempratue of 250° to 700° C.

10. The method defined in claim 1 wherein the active substances are introduced into the support bodies by a single impregnation.

* * * * *